(12) United States Patent
Hasegawa et al.

(10) Patent No.: US 8,485,300 B2
(45) Date of Patent: Jul. 16, 2013

(54) SPORTS TYPE, SADDLE TYPE ELECTRIC VEHICLE

(75) Inventors: Makoto Hasegawa, Wako (JP); Toshiaki Takamura, Wako (JP); Atsushi Yonehana, Wako (JP); Yoichi Taniguchi, Wako (JP); Masao Yoshinaga, Wako (JP); Yusuke Funayose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/364,419

(22) Filed: Feb. 2, 2012

(65) Prior Publication Data
US 2012/0193155 A1 Aug. 2, 2012

(30) Foreign Application Priority Data
Feb. 2, 2011 (JP) ................. 2011-020677

(51) Int. Cl.
*B62D 61/02* (2006.01)
(52) U.S. Cl.
USPC .......................................... 180/220
(58) Field of Classification Search
USPC ............... 180/219–220, 291, 298, 230, 65.2, 180/65.6, 69.6, 227, 297; 123/41.72, 185.1; 192/105, 52.1; 474/93, 144, 150
See application file for complete search history.

(56) References Cited

U.S. PATENT DOCUMENTS

| | | | | |
|---|---|---|---|---|
| 5,421,427 A * | 6/1995 | Ogawa et al. | ................. | 180/220 |
| 5,657,830 A * | 8/1997 | Kawashima et al. | ......... | 180/220 |
| 5,730,243 A * | 3/1998 | Koike et al. | ................... | 180/220 |
| 6,341,659 B1 * | 1/2002 | Ibukuro | ........................ | 180/219 |
| 6,412,451 B2 * | 7/2002 | Kuga et al. | ................ | 123/41.72 |
| 6,663,524 B2 * | 12/2003 | Gu et al. | ........................... | 475/5 |
| 6,722,460 B2 * | 4/2004 | Yang et al. | ................... | 180/220 |
| 7,182,167 B2 * | 2/2007 | Sasamoto | ..................... | 180/219 |
| 8,327,970 B2 * | 12/2012 | Furuse et al. | ................. | 180/336 |
| 8,371,411 B2 * | 2/2013 | Kawaguchi et al. | ......... | 180/220 |
| 8,376,075 B2 * | 2/2013 | Sasage et al. | ................ | 180/68.5 |
| 2005/0211481 A1 * | 9/2005 | Sasamoto | ................... | 180/65.2 |

FOREIGN PATENT DOCUMENTS

JP 4330588 B2 6/2009

* cited by examiner

*Primary Examiner* — John Walters
*Assistant Examiner* — James Triggs
(74) *Attorney, Agent, or Firm* — Birch, Stewart, Kolasch & Birch, LLP

(57) ABSTRACT

A drive wheel is intermediation driven by an additional element, while achieving a reduction in cost by making use of a plurality of existing motors. A drive motor as a drive source includes a plurality of motor bodies arranged coaxially with and adjacently to each other in the vehicle width direction to permit integral driving thereof, and is disposed forwardly of a pivot for a swing arm supporting the driving wheel. One end in the vehicle width direction of a drive shaft of the drive motor is made to be an output end for output to the driving wheel, and a drive sprocket for power transmission to the driving wheel is provided at the output end. The center of the drive motor in the vehicle width direction is disposed with an offset to the side opposite to the side of the drive sprocket with reference to the vehicle body center.

20 Claims, 13 Drawing Sheets

SPORTS TYPE, SADDLE TYPE ELECTRIC VEHICLE

CROSS-REFERENCE TO RELATED APPLICATIONS

The present application claims priority under 35 USC 119 to Japanese Patent Application No. 2011-020677 filed on Feb. 2, 2011 the entire contents of which are hereby incorporated by reference.

BACKGROUND OF THE INVENTION

1. Field of the Invention

The present invention relates to a saddle type electric vehicle such as a motorcycle of a sports type.

2. Description of Background Art

Heretofore, a drive motor and a generator are known that are arranged in parallel in the vehicle width direction of a motorcycle, and they are supplied with electric power to obtain a driving force. See, for example, Japanese Patent No. 4330588.

Meanwhile, in arranging a drive motor on a vehicle body of a sports type motorcycle, the output of the drive motor should be at a higher level for sports use. An attempt to install a large-type motor for exclusive use, however, leads to a rise in cost. It is considered to be preferable, therefore, to obtain a predetermined performance by making use of a plurality of existing motors, such as those used for four-wheel vehicles.

On the other hand, a drive motor, particularly a high-output type drive motor, has a larger weight. In sports type motorcycles for which maneuverability is an important factor, therefore, there is a demand for arrangement of a drive motor as a mass in the vehicle center.

SUMMARY AND OBJECTS OF THE INVENTION

In view of the foregoing, it is an object of an embodiment of the present invention to ensure that, in a sports type, saddle type electric vehicle, a driving wheel can be driven without intermediation by an additional element, such as an idle shaft, while achieving a low cost by making use of a plurality of existing motors.

As a means for solving the above problem, according to an embodiment of the present invention, there is provided a sports type, saddle type electric vehicle (1) having an electric drive motor (3) as a drive source for operating the vehicle. The drive motor 3 includes a plurality of unit motors (3a, 3b) arranged coaxially with and adjacently to each other in the vehicle width direction to permit integral driving thereof. The unit motors are disposed forwardly of a pivot (14a) for a swing arm (15) supporting a driving wheel (4). One end in the vehicle width direction of a drive shaft (39) of the drive motor (3) is an output end for output to the rear wheel (4) with a drive sprocket (58a) for power transmission to the driving wheel (4) being provided at the output end. The center (MCL) of the drive motor (3) in the vehicle width direction is disposed with an offset to the side opposite to the side of the drive sprocket (58a) with reference to the vehicle body center (CL).

In addition, the sports type, saddle type electric vehicle as described above includes generally those vehicles in which a driver is seated astride the vehicle body. Thus, the sports type saddle type electric vehicle includes not only motorcycles (inclusive of motor scooter type vehicles) but also three-wheel vehicles (inclusive of two-front-wheel one-rear-wheel vehicles as well as one-front-wheel two-rear-wheel vehicles) and four-wheel vehicles.

According to an embodiment of the present invention, the sports type, saddle type electric vehicle includes electric and electronic parts (43, 47, 41, 45, 44, 48) for the drive motor (3) that are disposed forwardly of the drive motor (3).

According to an embodiment of the present invention, the sports type, saddle type electric vehicle is characterized in that the electric and electronic parts (43, 47, 41, 45, 44, 48) include motor drivers (43, 47), contactors (41, 45) and electronic control devices (44, 48) arranged in this order from the lower side.

According to an embodiment of the present invention, the sports type, saddle type electric vehicle includes a main battery (2) which supplies electric power to the drive motor (3) with the main battery (2) having a plurality of battery modules (2a, 2b) which have combinations of a plurality of battery cells (17a to 17j) and which correspond to the unit motors (3a, 3b), respectively, and electric power is individually supplied from the battery modules (2a, 2b) to the unit motors (3a, 3b), respectively.

According to an embodiment of the present invention, the sports type, saddle type electric vehicle includes the main battery (2) that is disposed on the upper side of the drive motor (3).

According to an embodiment of the present invention, the sports type, saddle type electric vehicle includes a driving force that is transmitted from the drive shaft (39) to the driving wheel (4) through only a chain type transmission mechanism (58) including the drive sprocket (58a).

According to an embodiment of the present invention, the sports type, saddle type electric vehicle includes a rotation sensor (79) that detects the rotational speed of the drive shaft (39) that is provided at other end of the drive shaft (39) in the vehicle width direction.

According to an embodiment of the present invention, the sports type, saddle type electric vehicle includes a motor case (38) in which to house the unit motors (3a, 3b) is provided. On one end side in the vehicle width direction of the drive shaft (39), a rotation sensor (83) for detecting the rotational speed of the drive shaft (39) is provided inside the motor case (38) and between a side wall of the motor case (38) and the unit motor (3a) adjacent to the side wall.

According to an embodiment of the present invention, the sports type, saddle type electric vehicle includes a motor case (38) in which to house the unit motors (3a, 3b) is provided. A sub-battery (51) for accessories is disposed under the motor case (38), and the sub-battery (51) is supported by the motor case (38).

According to an embodiment of the present invention, the sports type, saddle type electric vehicle includes a main frame (13) extending to the rear from a head pipe (12) and a pivot frame (14) extending downward from a rear end of the main frame (13). In the vehicle side view, the drive motor (3) is disposed in an area surrounded by the main frame (13) and the pivot frame (14), while the drive shaft (39) is disposed above the pivot (14a).

According to an embodiment of the present invention, the drive motor is formed by arranging a plurality of unit motors adjacently to each other in the vehicle width direction at a position near the vehicle body center forwardly of the pivot. This ensures that a desired motor output can be obtained through appropriate selection of a motor for general purpose or a motor for four-wheel vehicles, etc. Accordingly, it is possible to provide a drive motor which is inexpensive, high in general-purpose properties and, particularly, having a high output suitable for a sports type motorcycle.

In addition, the vehicle-width-directional center of the drive motor is disposed with an offset from the vehicle-width-directional center of the vehicle body, whereby the drive sprocket provided on the drive shaft of the drive motor can easily be disposed at a predetermined position in the vehicle width direction. Consequently, the chain line can be adjusted easily even where existing motors are made use of, so that a simple wheel drive system from the drive sprocket can be adopted.

According to an embodiment of the present invention, thermal influence of the drive motor on the electric and electronic parts is suppressed, and airflow (induced by the flow of air) is permitted to easily impinge on the electric and electronic parts, whereby the cooling performance can be enhanced.

According to an embodiment of the present invention, the parts on which the airflow is desired to easily impinge can be disposed on the lower side in the vehicle, while the parts on which influences of disturbances are desired to be reduced can be disposed on the upper side of the vehicle.

According to an embodiment of the present invention, electric power can be supplied from the battery modules to the unit motors, respectively, without mutual influences.

According to an embodiment of the present invention, the main battery with a heavy weight can be disposed on the upper side in the vehicle. Therefore, drivability of the motorcycle can be enhanced, and a contribution to mass concentration can be attained.

According to an embodiment of the present invention, the rear wheel is driven by the drive shaft in a direct manner through only the chain type transmission mechanism, so that the power transmission to the rear wheel can be achieved without intermediation by a plurality of transmission mechanisms. Therefore, a loss in the drive system can be minimized. Consequently, an increase in mileage of the electric vehicle can be promised with reductions in size and weight of the drive parts being ensured.

According to an embodiment of the present invention, drive control on each of the unit motors according to the rotational speed of the drive shaft can be performed.

According to an embodiment of the present invention, drive control on each of the unit motors can be performed using a single rotation sensor. In addition, with the rotation sensor housed in the motor case the influences of disturbances can be suppressed.

According to an embodiment of the present invention, the sub-battery can be mounted without needing any exclusive holding part or space.

According to an embodiment of the present invention, the drive shaft (center-of-gravity position) of the drive motor can be disposed at a position as upper as possible in the vehicle, and drivability (turning performance) of the motorcycle can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
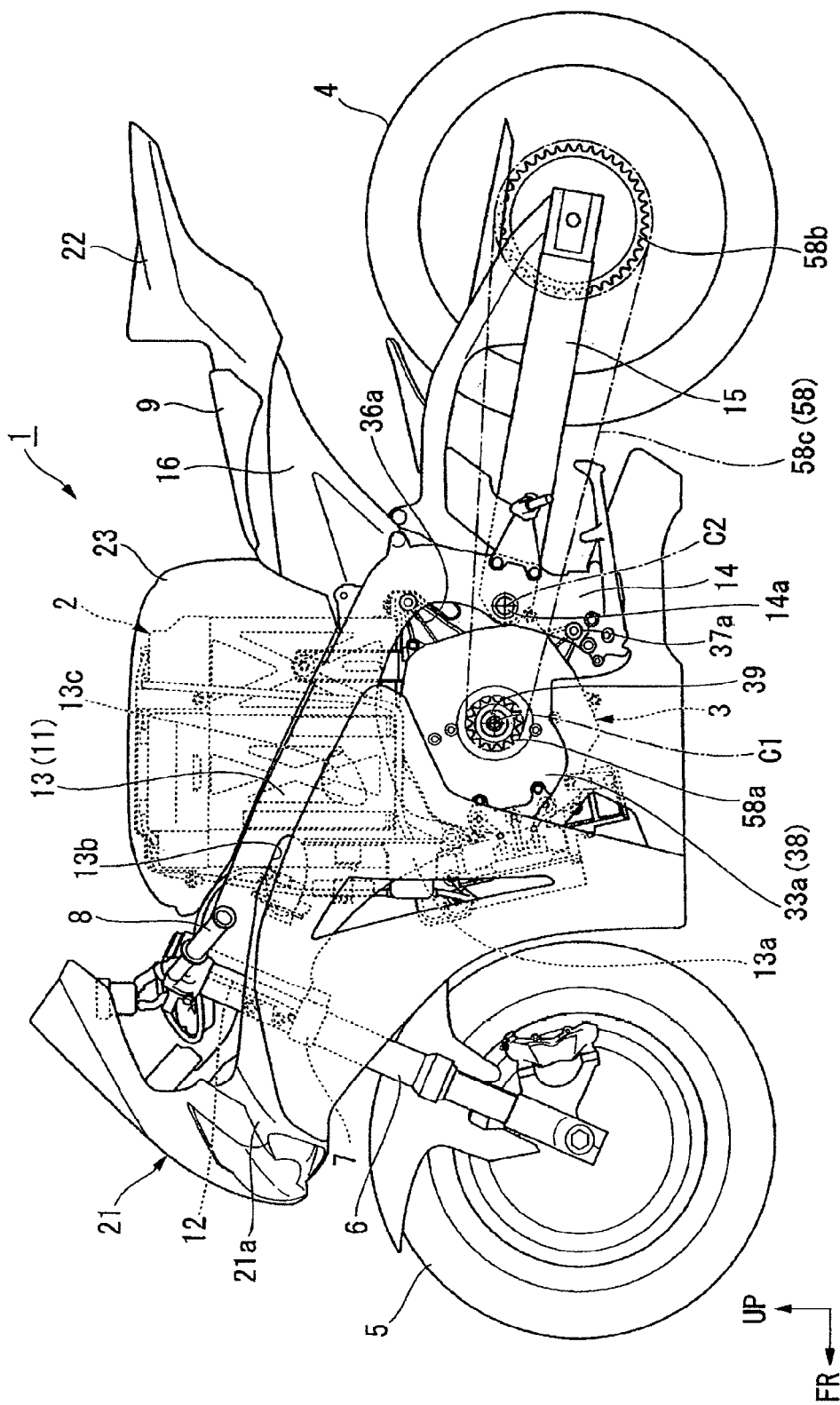
FIG. 1 is a left side view of a sports type, saddle type electric vehicle according to an embodiment of the present invention.

An embodiment of the present invention will be described below referring to the drawings. The directions such as forward, rearward, leftward and rightward directions in the following description indicate the same directions as the directions with reference to the vehicle described below, unless otherwise specified. In addition, arrow FR indicative of the vehicle front side, arrow LH indicative of the vehicle left-hand side and arrow UP indicative of the vehicle upper side are shown in appropriate areas of the figures used in the following description.

Figure 2:
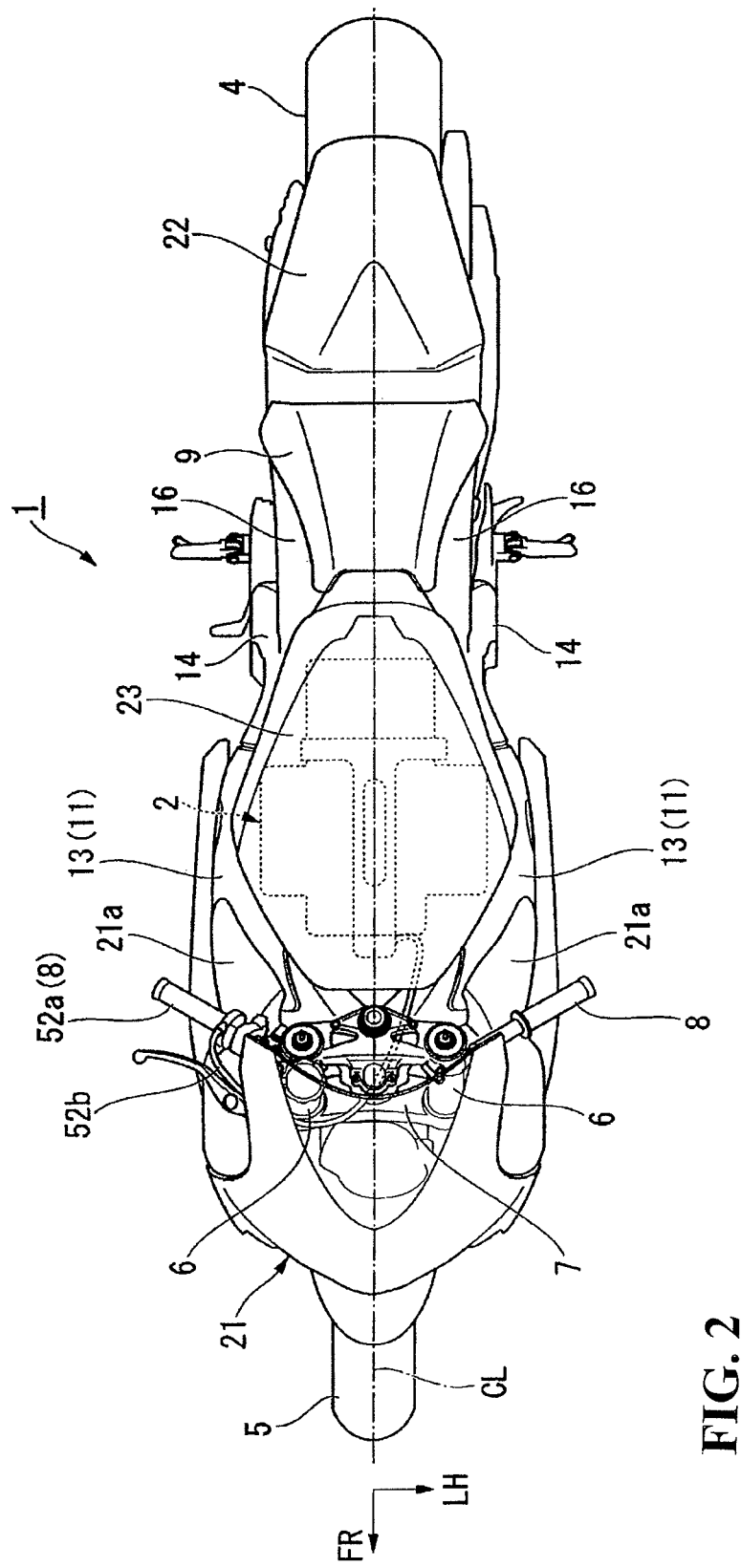
FIG. 2 is a top view of the saddle type electric vehicle.

In a sports type, saddle type electric vehicle 1 shown in FIGS. 1 and 2, a main battery 2 for traveling is mounted at a central upper portion of a vehicle body, a drive motor (motor unit) 3 for traveling is mounted at a central lower portion of the vehicle body, the drive motor 3 is driven by electric power supplied from the main battery 2, and a driving force of the drive motor 3 is transmitted to a rear wheel 4 provided as a driving wheel, whereby the vehicle is propelled.

The saddle type electric vehicle 1 has a mode as a motorcycle of a sports type (corresponding to a motorcycle with a parallel 4-cylinder 600 to 1000 cc engine), wherein a front wheel 5 is rotatably supported on lower end portions of a pair of left and right parts of a front fork 6, and upper portions of the left and right parts of the front fork 6 are steerably supported on a head pipe 12 at the front end of a body frame 11, through a steering stem 7. A steering handle bar 8 is mounted to an upper portion of the steering stem 7 (or of the front fork 6).

A pair of left and right main frames 13 extend rearwardly downward from the head pipe 12, and pivot frames 14 extend respectively from rear end portions of the left and right main frames 13. On the left and right pivot frames 14 a swing arm 15 is supported at its front end portion through a pivot 14a so as to be swingable upward and downward, and the rear wheel 4 is rotatably supported on a rear end portion of the swing arm 15.

A front portion of the vehicle body of the saddle type electric vehicle 1 is covered with a cowling 21 on the front side, lateral sides and lower side thereof. The main battery 2 is mounted between the left and right main frames 13, and the drive motor 3 is mounted under the left and right main frames 13. On the lower side of front portions of the left and right main frames 13, motor hangers 13a extend downward and the drive motor 3 is supported at its front portion by lower end portions of the left and right motor hangers 13a.

From rear end portions of the left and right main frames 13 and the left and right pivot frames 14, seat frames 16 extend rearwardly upward and a seat 9 on which a rider is to be seated is supported on the seat frames 16. The surroundings of the seat frames 16 are covered with a seat cowl 22. The body frame 11 inclusive of the seat frames 16 has a structure in which a plurality of kinds of metallic members are joined together by welding, fastening or the like.

At the front of the seat 9, a seat front cover 23 is disposed which bulges upward above the upper edges of the left and right main frames 13. The seat front cover 23 is interposed between both knees of the rider seated on the seat 9. In the seat front cover 23, an upper portion of the main battery 2 is housed.

Figure 3:
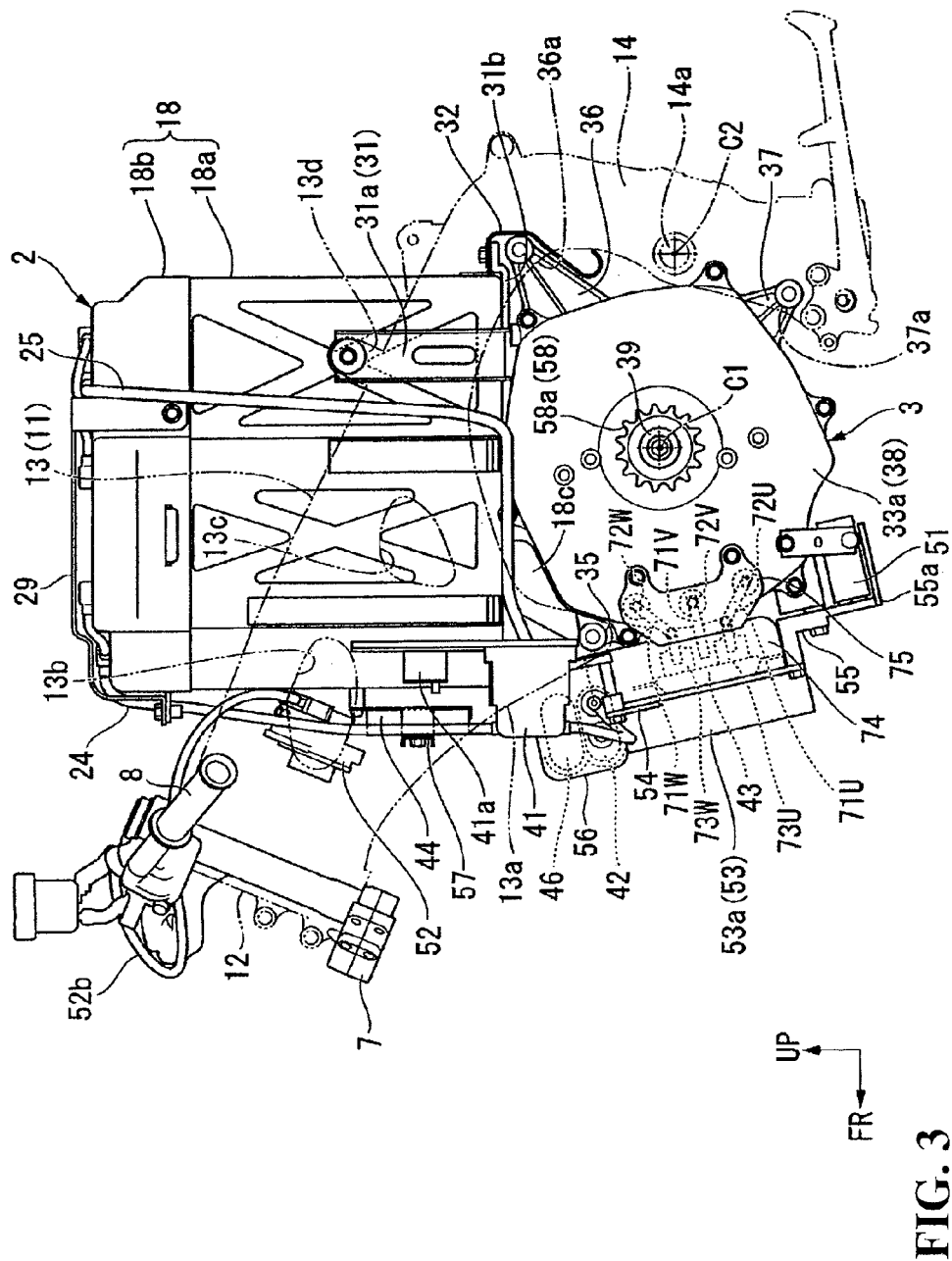
FIG. 3 is a left side view of a major part of the saddle type electric vehicle.
Figure 4:
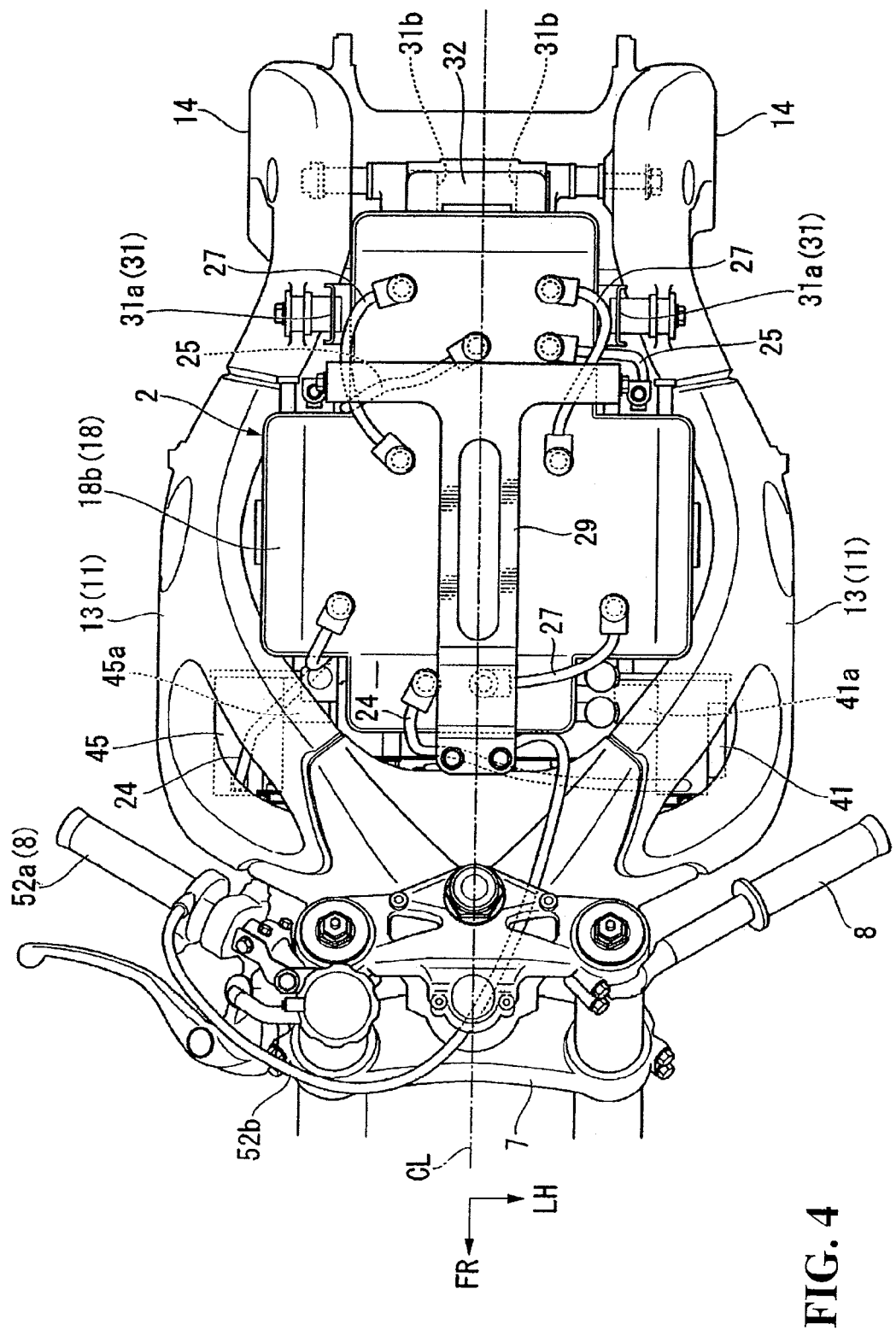
FIG. 4 is a top view of a major part of the saddle type electric vehicle.
Figure 8:
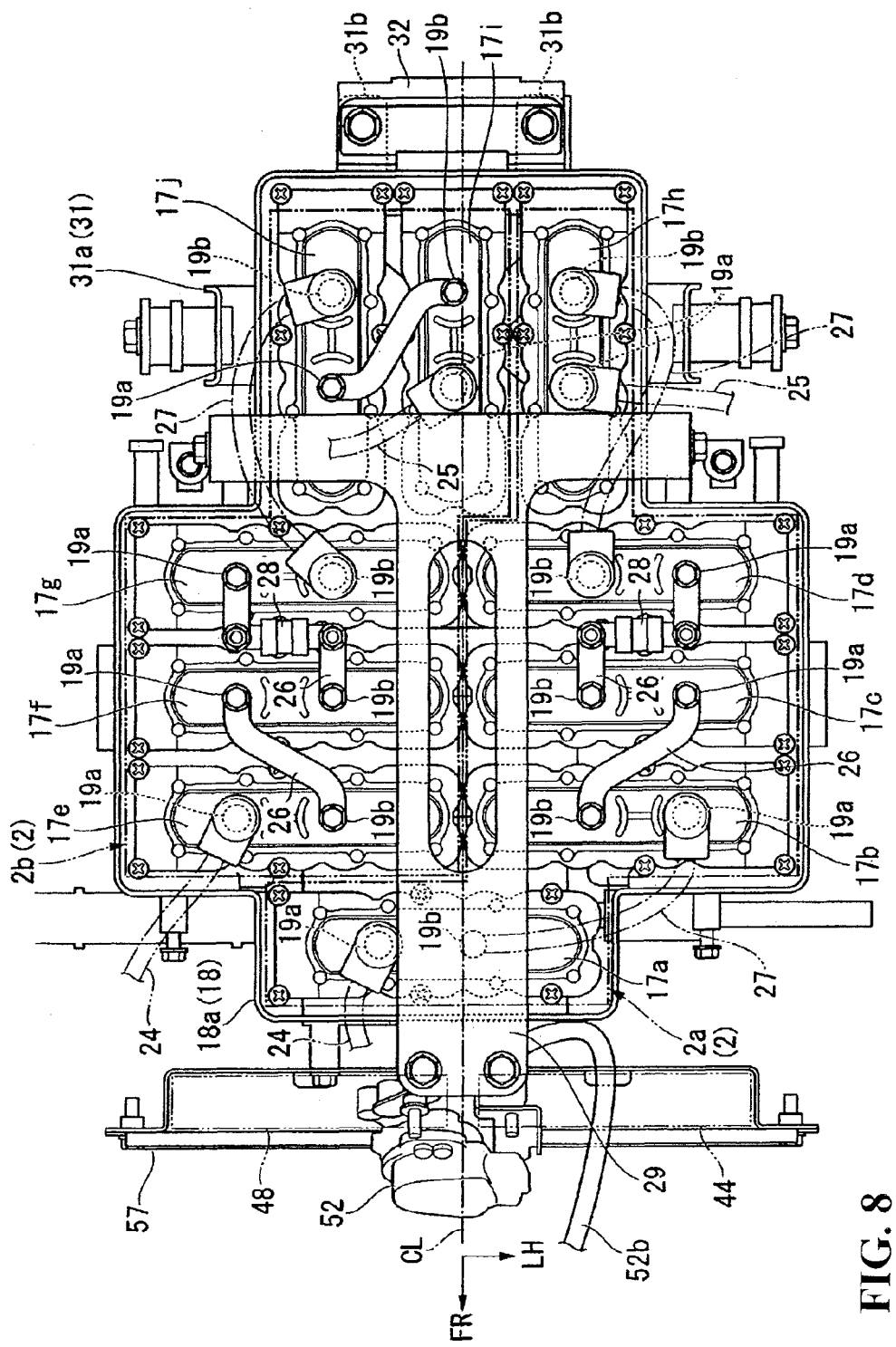
FIG. 8 is a top view of a main battery in the saddle type electric vehicle.

As shown in FIGS. 3, 4 and 8, the main battery 2 includes a total of ten battery cells 17a to 17j contained in a battery case 18. The battery case 18 has a case body 18a has a roughly rectangular parallelepiped box-like shape opening upwardly, and a case cover 18b adapted to close the upper opening of the case body 18a. Outer walls of the case body 18a are appropriately formed with openings. In addition, FIG. 8 shows a state in which the case cover 18b is removed.

Each of the battery cells 17a to 17j has a thick plate-like shape rising in the vertical direction and disposed in a front end portion and back-and-forth-directionally intermediate portions of the main battery 2 so that the thickness direction thereof is orthogonal to the vehicle in a back-and-forth direction, and is so disposed in a rear portion of the main battery 2 that the thickness direction thereof is orthogonal to the vehicle width (left-right) direction.

In the front end portion of the main battery 2, one battery cell 17a is disposed across the vehicle-width-directional center line CL. In the back-and-forth-directionally intermediate portion of the main battery 2, a total of six battery cells 17b to 17g, three on the left and three on the right with reference to the center line CL, are arrayed along the back-and-forth direction. In the rear portion of the main battery 2, three battery cells 17h to 17j are arrayed along the left-right direction, across the center line CL. The battery cells 17b to 17g in the back-and-forth-directionally intermediate portion of the main battery 2 are arranged symmetrically on the left and right sides, whereas the battery cells 17a in the front end portion of the main battery 2 and the battery cells 17h to 17j in the rear portion are arranged at slightly rightwardly deviated positions.

Due to such an arrangement of the battery cells 17a to 17j, the main battery 2 and the battery case 18 are so provided that the left-right width thereof is greater in the back-and-forth-directionally intermediate portion than in the front end portion and the rear portion. This ensures that the main battery 2 can be contained more favorably in the seat front cover 23, which has an elliptic shape elongated in the back-and-forth direction in top view (see FIG. 2), and the left-right width of a rear portion of the seat front cover 23 is suppressed to a small value, promising easy knee-grip.

Referring to FIG. 8, the battery cells 17a to 17j are arranged with gaps therebetween so that outside air (cooling air) flowing into the battery case 18 can be circulated therebetween. The battery cells 17a to 17j constitute an energy storage capable of being charged and discharged as required. Each are composed, for example, of a lithium ion battery, a nickel-hydrogen battery, a lead battery or the like.

At the upper end of each of the battery cells 17a to 17j, a positive electrode terminal 19a and a negative electrode terminal 19b are projectingly provided.

Here, the battery cell 17a in the front end portion of the main battery 2, the battery cells 17b to 17d on the left side in the back-and-forth-directionally intermediate portion of the main battery 2 and the battery cell 17h on the left side in the rear portion of the main battery 2, among the battery cells 17a to 17j, are connected in series to form a first battery module 2a of a predetermined high voltage (48 to 72 V).

On the other hand, the battery cells 17e to 17g on the right side in the back-and-forth-directionally intermediate portion of the main battery 2 and the battery cells 17i and 17j on the right side in the rear portion of the main battery 2 are connected in series to form a second battery module 2b of a high voltage similarly.

The battery modules 2a and 2b supply electric power respectively to first and second motor bodies 3a and 3b which will be described later.

Output cables 24, 25 extend from external-output positive electrodes and external-output negative electrodes, respectively, of the battery modules 2a, 2b, respectively. Inter-electrode bridges 26 and cables 27 are provided for respective interconnections of positive and negative electrodes in the battery modules 2a, 2b. A fuse 28 is provided at an intermediate portion of each of the inter-electrode bridges 26 in the battery modules 2a, 2b. A fixing bracket 29 is provided for fixing the case cover 18b to the case body 18a.

Referring to FIGS. 3 and 4, the main battery 2 and the battery case 18 are so disposed that their lower portions get between the left and right main frames 13. The main frame 13 is formed in its front portion with front and rear openings 13b, 13c penetrating it in the vehicle width direction. The openings 13b, 13c serve for controlling the rigidity of the body frame 11 as a whole, and the front opening 13b is used also as a cooling air introduction port for introducing cooling air to the main battery 2.

Referring to FIGS. 1 and 2 as well, outside air introduction ducts 21a extend forward from the front openings 13b, and the front ends of the outside air introduction ducts 21a open at the front end of the cowling 21 toward the vehicle forward side. Airflows (cooling airflows) induced by the flow of air during operation are supplied through the outside air introduction ducts 21a to the main battery 2 between the main frames 13.

Figure 10:
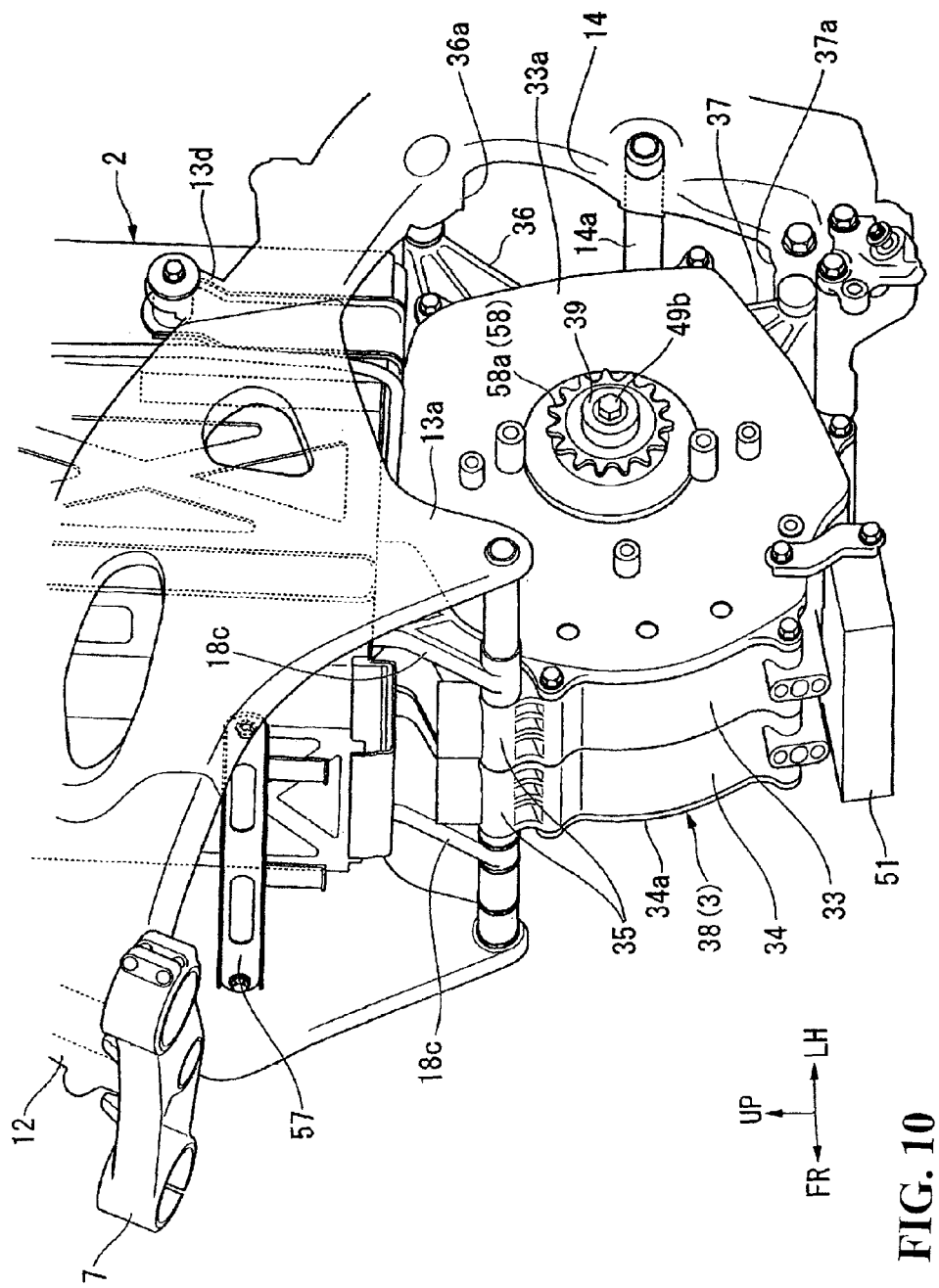
FIG. 10 is a perspective view, as viewed obliquely from a left front side, of the vicinity of a drive motor of the saddle type electric vehicle.

As shown in FIGS. 3 and 10, a pair of left and right battery front support arms 18c extend forwardly downward from a lower surface of a front portion of the battery case 18. Lower end portions of the left and right battery front support arms 18c are supported on and fixed to lower end portions of the left and right motor hangers 13a of the body frame 11 by fastening bolts, together with motor front support sections 35 which will be described later.

Figure 6:
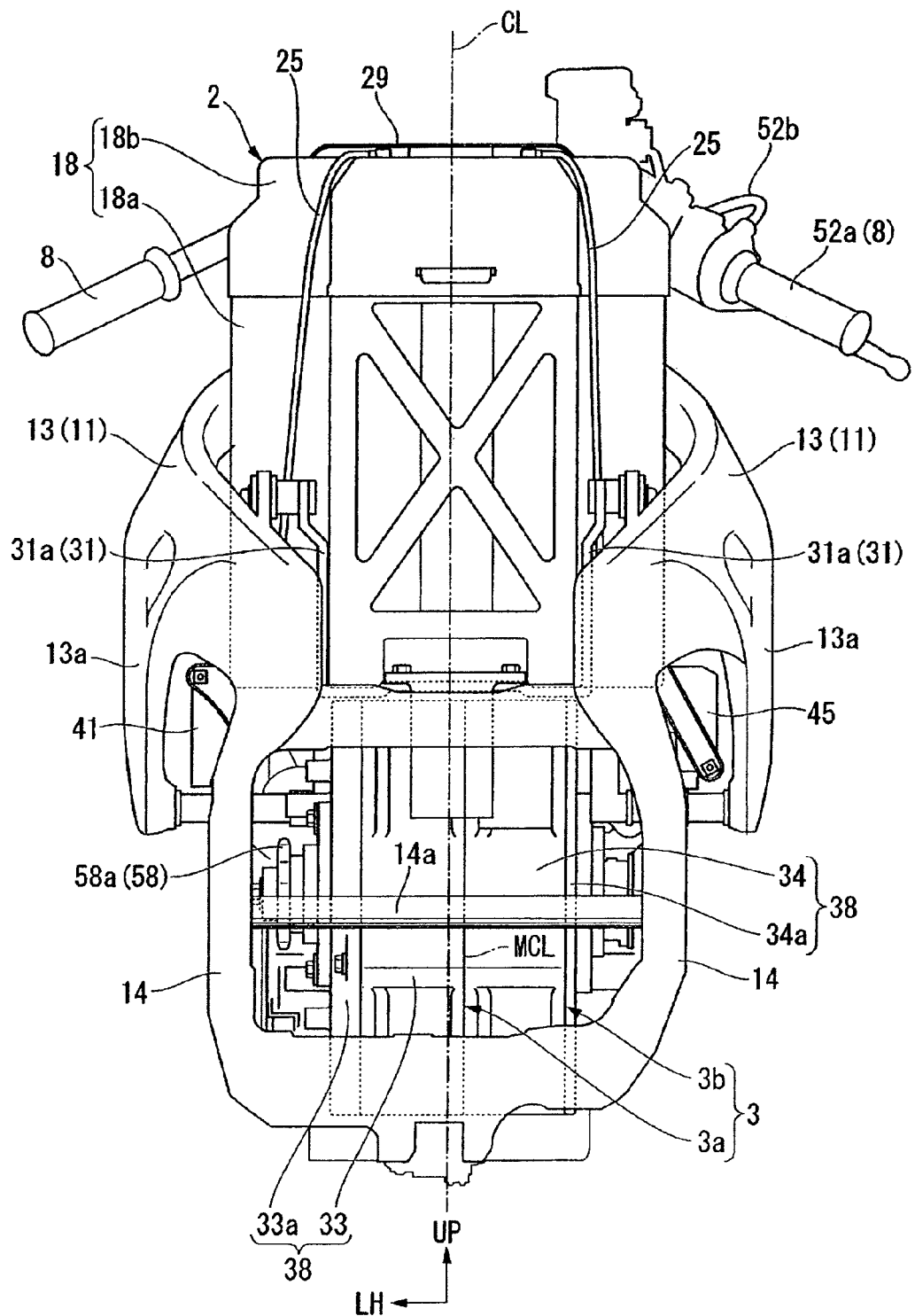
FIG. 6 is a rear view of a major part of the saddle type electric vehicle.

On the other hand, as shown in FIGS. 3 and 6, a rear portion of the battery case 18 is supported on the body frame 11 through battery rear support brackets 31. The battery rear support bracket 31 has a band-like bracket body 31a bent to extend along the lower side of a rear portion of the battery case 18, and a connection piece 31b extending rearwardly from a lower edge portion of the bracket body 31a. Upper ends of left and right edge portions of the bracket bodies 31a are supported on and fixed to battery support projections 13d projectingly provided on the upper side of rear portions of the left and right main frames 13, by fastening bolts. A rear end of the connection piece 31b is supported on and fixed to an upper end of a support stay 32, which is fixed to a motor rear upper support sections 36 of the drive motor 3, by fastening a bolt.

In this manner, the main battery 2 and the battery case 18 are fixedly supported on the body frame 11.

As shown in FIGS. 1 and 3, the drive motor 3 is provided so as to be contained in the area surrounded by the main frames 13, the pivot frames 14 and the motor hangers 13a in vehicle side view. The drive motor 3 has a single drive shaft 39 penetrating its center along the left-right direction in side view (see FIG. 13). The drive shaft 39 is so provided that its center axis (axis; corresponding to the center-of-gravity position of the drive motor 3) C1 is located above the center axis (axis) C2 of the pivot 14a.

Figure 11:
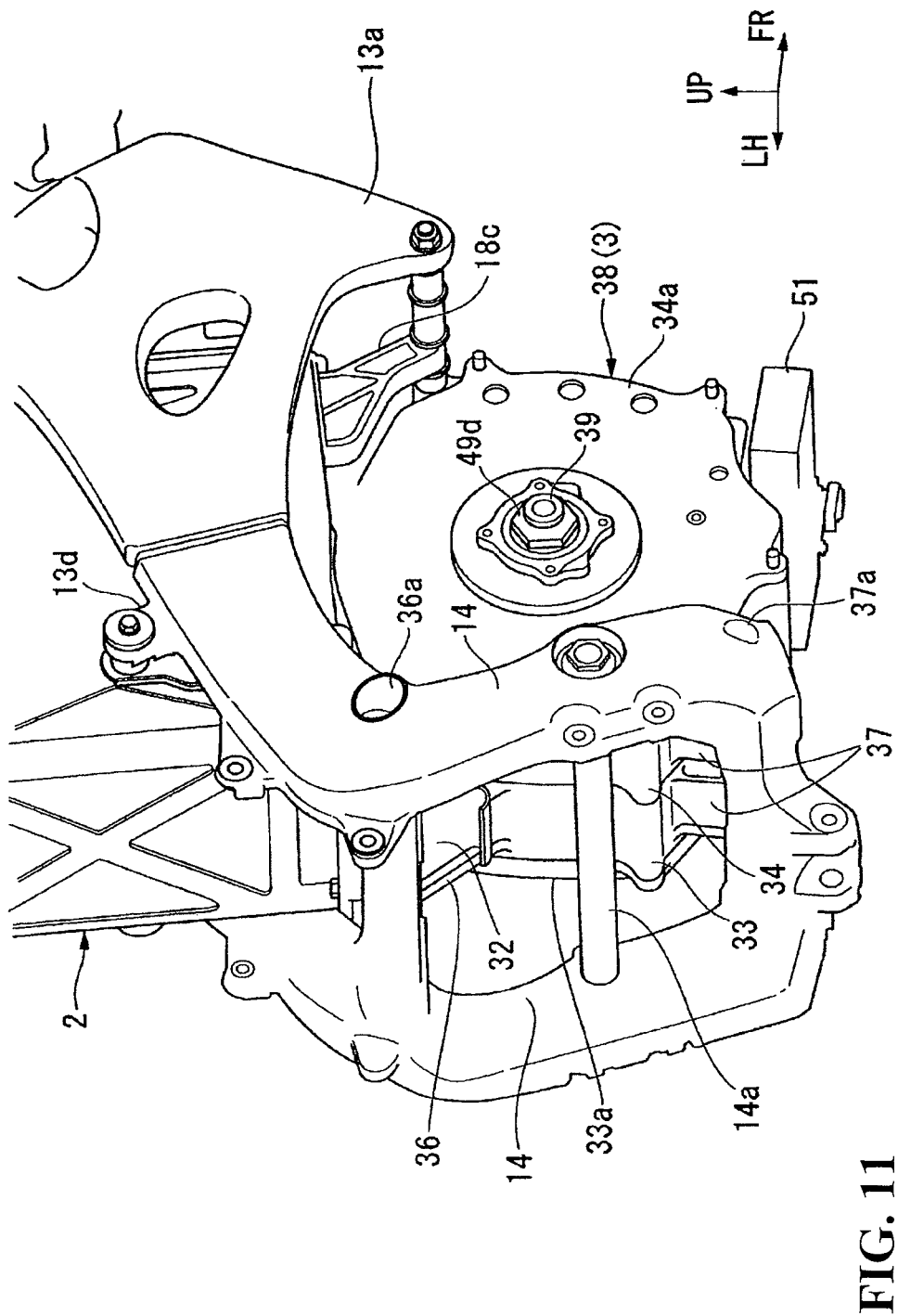
FIG. 11 is a perspective view, as viewed obliquely from a right rear side, of the vicinity of the drive motor.

Referring to FIGS. 10 and 11 as well, the drive motor 3 has a pair of left and right motor bodies (unit motors) 3a, 3b having a flat shape with a comparatively small left-right width (axial width). The motor bodies 3a, 3b are disposed adjacent to each other and coupled coaxially with each other to permit integral driving thereof. The drive motor 3 has a left-right width set to be smaller than the space between the left and right main frames 13 and between the pivot frames 14. Hereinafter, the left-side one of the motor bodies 3a, 3b will be referred to as a first motor body 3a, and the right-side one as a second motor body 3b. In addition, a mating surface between the motor bodies 3a, 3b corresponds to the vehicle-width-directional center of the drive motor 3, and this is denoted as a motor left-right center line by reference symbol MCL in FIGS. 6 and 13.

Figure 12:
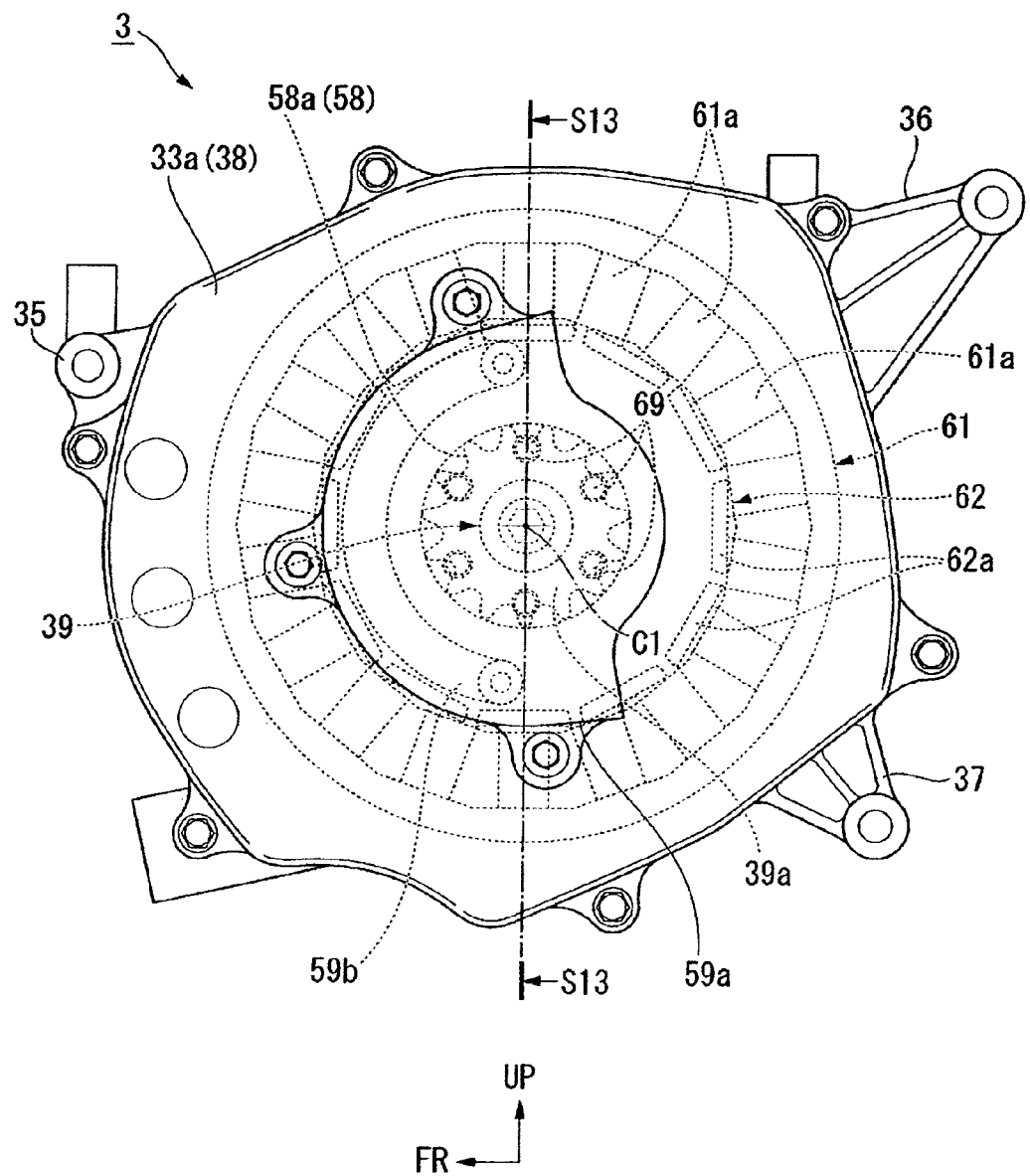
FIG. 12 is a left side view of the drive motor.
Figure 13:
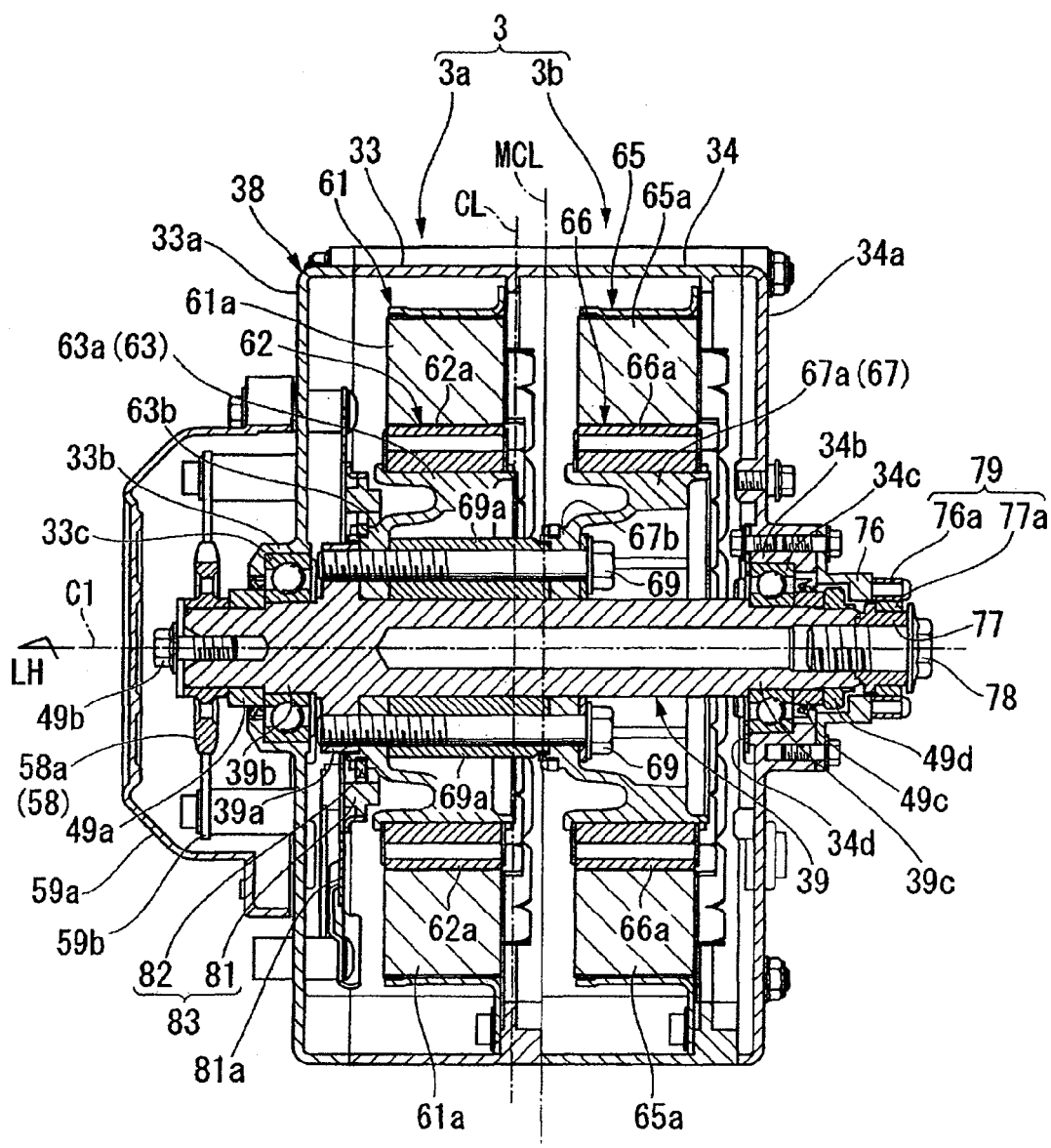
FIG. 13 is a sectional view taken along line S13-S13 of FIG. 12.

Referring to FIGS. 12 and 13 as well, each of the motor bodies 3a, 3b is of an inner rotor type in which a rotor is disposed inside a stator. The motor bodies 3a, 3b each have annular first and second casings 33, 34. At the upper side of front end portions of the casings 33, 34 the motor front support sections 35 are respectively integrally formed which project upwardly forward. With the motor front support sections 35 clamped between the left and right battery front support arms 18c of the battery case 18, the casings 33, 34 are supported on and fixed to the lower ends of the left and right motor hangers 13a by fastening bolts.

On the other hand, at the upper side of rear end portions of the casings 33, 34 the motor rear upper support sections 36 are respectively integrally formed which extend upwardly and rearwardly, and which are supported on and fixed to the left and right inner sides of pivot upper fastening sections 36a on the front side of upper end portions of the left and right pivot frames 14 by fastening bolts. In addition, at the lower side of rear end portions of the casings 33, 34 motor rear lower support sections 37 are respectively integrally formed which extend downwardly and rearwardly, and which are supported on and fixed to the left and right inner sides of pivot lower fastening sections 37a on the front side of lower end portions of the left and right pivot frames 14 by fastening bolts.

Figure 9:
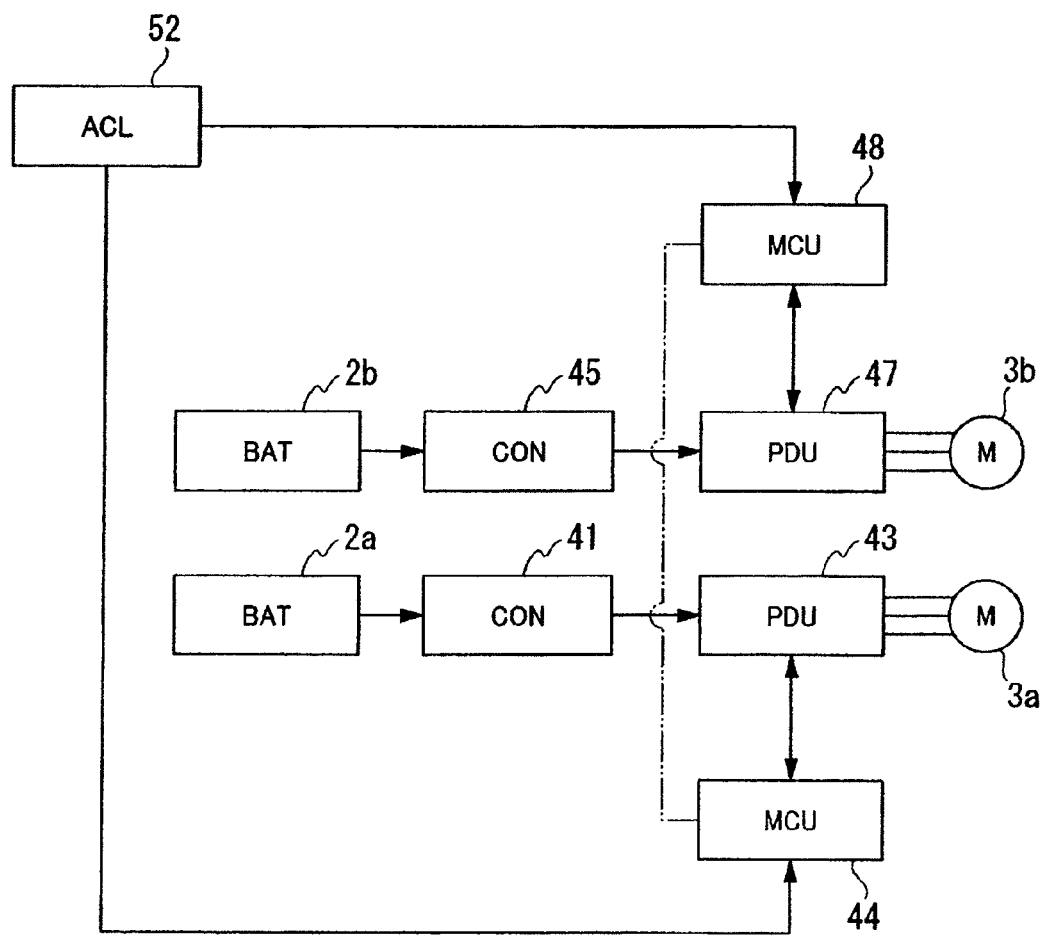
FIG. 9 is a block diagram showing a main configuration of the saddle type electric vehicle.

As shown in FIG. 9, electric power from the first battery module 2a is supplied through a first contactor 41 operative in conjunction with a main switch (not shown) to a first PDU (power driver unit) 43 provided as a motor driver. In the first PDU 43 the electric power is converted from DC power into three-phase AC power, which is supplied to the first motor body 3a composed of a three-phase AC motor.

Similarly, electric power from the second battery module 2b is supplied through a second contactor 45 operative in conjunction with the main switch to a second PDU 47 provided as a motor driver. In the second PDU 47 the electric power is converted from DC power into three-phase AC power, which is supplied to the second motor body 3b composed of a three-phase AC motor.

Figure 7:
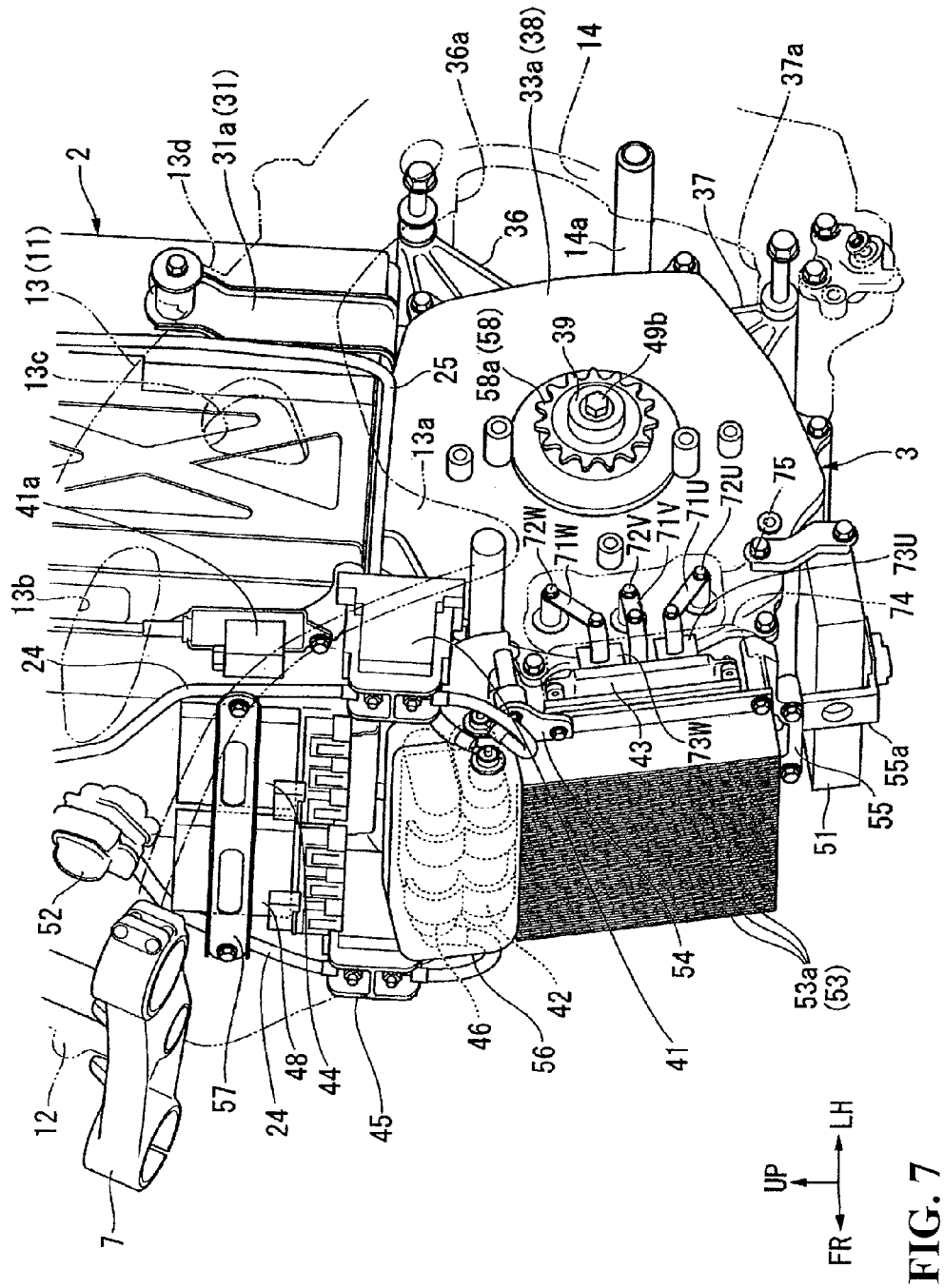
FIG. 7 is a perspective view, as viewed obliquely from a left front side, of a major part of the saddle type electric vehicle.

Referring to FIG. 7 as well, a 12-V sub-battery 51 is disposed on the lower side of the front of the drive motor 3. Electric power from the sub-battery 51 is supplied to general electrical parts, such as lamps, and control system parts such as ECU (electric control unit).

A first MCU (motor control unit) 44 as an ECU is connected to the first PDU 43, and a second MCU 48 is similarly connected to the second PDU 47. The MCUs 44, 48 are supplied with output demand signals from a throttle (accelerator) sensor 52, and the MCU 44, 48 individually apply drive control to the motor bodies 3a, 3b through the PDU 43, 47 on the basis of the output demand signals, respectively. In the present embodiment, the MCUs 44 and 48 do not perform mutual monitoring or communication; as shown in FIG. 9 by a dashed-two dotted line, however, the MCU 44 and 48 can be interconnected to be capable of communication, thereby mutually monitoring the motor body output, etc. or applying cooperative control or left/right independent control to the outputs, etc.

In addition, in the saddle type electric vehicle 1 according to the present embodiment, at the time of charging the main battery 2, the main battery 2 may be charged in an on-vehicle state wherein the main battery 2 is only exposed to the outside of the vehicle by, for example, detaching the seat front cover 23. Or, alternatively, the main battery 2 may be charged in a unit state wherein the main battery 2 has been dismounted from the vehicle body.

Figure 5:
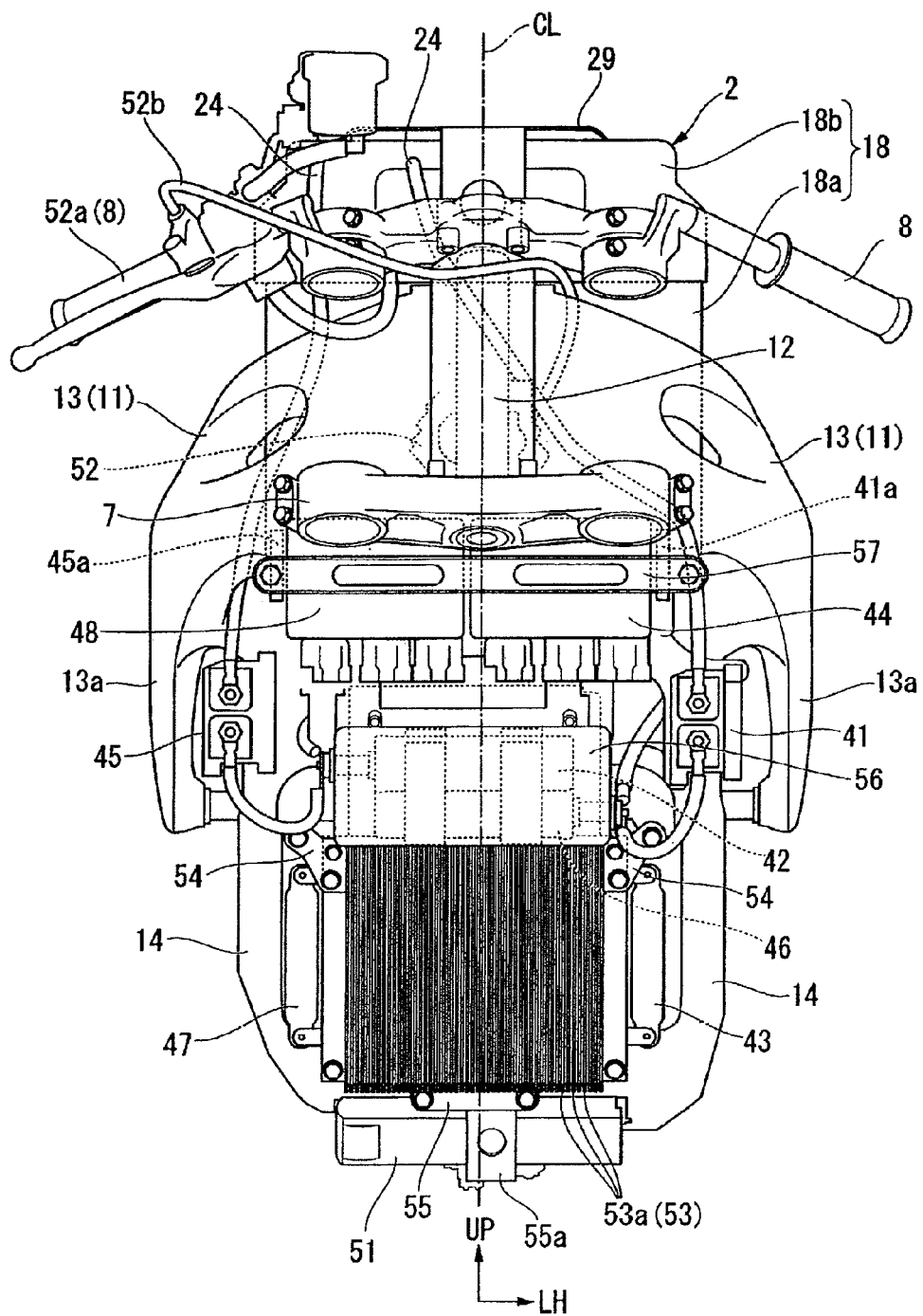
FIG. 5 is a front view of a major part of the saddle type electric vehicle.

As shown in FIGS. 3, 5 and 7, at the front of a front end portion of the drive motor 3 the PDUs 43, 47 corresponding to the motor bodies 3a, 3b are arranged side by side on the left and right sides, respectively. Each of the PDUs 43, 47 is thick plate-like in shape and is disposed in an erect posture such that its thickness direction is substantially orthogonal to the vehicle back-and-forth direction (more specifically, the thickness direction is slightly inclined forwardly downward). At the immediate front of the PDUs 43, 47, a plate-like heat sink 53 is disposed in parallel to the PDUs 43, 47.

The heat sink 53 is provided at a front surface thereof with a multiplicity of radiation fins 53a extending along the vertical direction, and front surfaces of the PDUs 43, 47 are put in contact with a rear surface of the heat sink 53. The heat sink 53 is supported at its upper portion by an upper portion of the motor case 38 of the drive motor 3 through upper brackets 54, and at its lower portion by a lower portion of the motor case 38 through lower brackets 55. The lower bracket 55 is integrally provided with a battery support stay 55a which extends while being bent in an L shape, in a side view, along a front surface and a lower surface of the sub-battery 51, in order to support the sub-battery 51.

On the upper side of the heat sink 53, first and second capacitors 42, 46 are provided which correspond to the contactors 41, 45 and the PDUs 43, 47, respectively. The capacitors 42, 46, each having a rod-like shape which has an elliptic cross-sectional shape elongated in the back-and-forth direction and extends in the left-right direction, are disposed on the upper side of the heat sink 53 in a stacked state as upper and lower layers. The capacitors 42, 46 are contained together in a capacitor case 56.

The contactors 41, 45 are disposed respectively in areas which are located on the left and right outer sides relative to the capacitors 42, 46 and on upper rear sides of the capacitors 42, 46 in side view. Each of the contactors 41, 45 is rectangular parallelepiped in shape and is disposed between the capacitor 42, 46 and the left or right motor hanger 13a located on the left or right outer side relative to the capacitor 42, 46. Comparatively small precharge contactors 41a, 45a are disposed on the upper side of the contactors 41, 45, respectively.

The MCUs 44, 48 are disposed, while being arrayed on the left and right sides, above the contactors 41, 45 and on the front side of a lower portion of the main battery 2. Each of the MCUs 44, 48 has a rectangular parallelepiped shape comparatively small in back-and-forth width, and is supported by an MCU support bracket 57 fixed to the front side of a lower portion of the battery case 18.

On the upper side of the MCUs 44, 48 the throttle sensor 52 is disposed which is fixed to the body frame 11 on the rear side of the head pipe 12. The throttle sensor 52 is connected to a right grip 52a, serving as a throttle operator, of the handle bar 8 through an operation cable 52b. An opening/closing operation conducted at the right grip 52a is mechanically transmitted to the throttle sensor 52 through the operation cable 52b. A control signal according to the opening/closing operation is outputted from the throttle sensor 52 to each of the MCUs 44, 48.

Referring to FIGS. 12 and 13, the motor bodies 3a, 3b include annular first and second stators 61, 65 fixedly supported respectively on the inner peripheries of the casings 33, 34, and cylindrical first and second rotors 62, 66 rotatably disposed inside the stators 61, 65, respectively. The rotors 62, 66 are integrally coupled to each other through the drive shaft 39 penetrating them coaxially.

A left case cover 33a for closing a left opening of the first casing 33 is attached to the left of the first casing 33, and a right case cover 34a for closing a right opening of the second casing 34 is attached to the right of the second casing 34. The casings 33, 34 and the case covers 33a, 34a are integrally connected to one another by fastening bolts, to form the motor case 38 for the drive motor 3.

Referring to FIG. 1, a left end portion of the drive shaft 39 protrudes to the left from a central portion of the left case cover 33a, and a drive sprocket 58a is attached to the thus protruding portion. The drive sprocket 58a, a driven sprocket 58b attached to the left side of the rear wheel 4, and a drive chain 58c wrapped around the sprockets constitute a chain-type transmission mechanism 58 between the drive motor 3 and the rear wheel 4.

A sprocket cover 59a for covering the surroundings of the drive sprocket 58a and a chain guide 59b for suppressing floating of the drive chain 58c are mounted to the left of the left case cover 33a.

The drive motor 3 is put into variable-speed drive by VVVF (variable voltage variable frequency) control, for example. The rotational speed of the drive motor 3 is detected by rotation sensors 79, 83 which will be described later.

Referring to FIGS. 3 and 7, feeder terminals 72u, 72v, 72w to which to connect three-phase feeder pieces 71u, 71v, 71w extending to the rear from the left or right side of the PDU 43, 47 are provided at a front end portion of each of the case covers 33a, 34a. The feeder pieces 71u, 71v, 71w and the feeder terminals 72u, 72v, 72w correspond, for example, to U-phase, V-phase and W-phase, in this order from the lower side. Currents from the PDUs 43, 47 are supplied respectively to coils 61a, 65a of the stators 61, 65 in the motor bodies 3a, 3b through the feeder pieces 71u, 71v, 71w and the feeder terminals 72u, 72v, 72w.

Current sensors 73u, 73w are respectively provided on the base end side of the feeder pieces 71u, 71w, corresponding to U-phase and W-phase, of the PDUs 43, 47. The peripheries of the PDUs 43, 47 are each covered with a driver cover 74, while the peripheries of the feeder pieces 71u, 71v, 71w and the feeder terminals 72u, 72v, 72w are covered with a feeder section cover 75.

Referring to FIGS. 12 and 13, the rotors 62, 66 have rotor bodies 63, 67 holding magnets 62a, 66a on the outer peripheries thereof, respectively. In the rotor bodies 63, 67, inner flange sections 63b, 67b to be penetrated by the drive shaft 39 are disposed with a leftward offset in relation to annular magnet holding sections 63a, 67a provided at the outer peripheries. The inner flange sections 63b, 67b are penetrated by a plurality (six) of fastening bolts 69 from the right side, and tip potions of the fastening bolts 69 are put into screw engagement with a plurality of screw holes in a fastening flange 39a formed at the outer periphery of a left side portion of the drive shaft 39, whereby the rotors 62, 66 are connected to the drive shaft 39 so that they can be rotated as one body.

Between the inner flange sections 63b, 67b a plurality (six) of collars 69a are provided through which the fastening bolts 69 are passed respectively. The collars 69a are clamped between the inner flange sections 63b, 67b upon tightening of the fastening bolts 69, whereby the distance between the inner flange sections 63b, 67b is maintained.

That part of a left side portion of the drive shaft 39 which penetrates the left case cover 33a is made to be a left journal 39b. The left journal 39b is rotatably supported on a left hub section 33b, formed on the left case cover 33a, through a left radial ball bearing 33c. The fastening flange 39a is disposed adjacent to the right of the left radial bearing 33c.

In addition, a right side portion of the drive shaft 39 penetrates a central portion of the right case cover 34a. That part of the right side portion of the drive shaft 39 which penetrates the right case cover 34a is made to be right journal 39c. The right journal 39c is rotatably supported on a right hub section 34b, formed on the right case cover 34a, through a right radial ball bearing 34c.

The drive sprocket 58a is spline-fitted at its inner periphery to the outer periphery of that part of the drive shaft 39 which protrudes to the left side of the left radial ball bearing 33c and the left hub section 33b. A left collar 49a is clamped between the right end of the drive sprocket 58a and a stepped surface descending from the left end of the left journal 39b to the inner periphery side. In this condition, a left bolt 49b is put into screw engagement with a left end screw hole in the drive shaft 39 and tightened, whereby the drive sprocket 58a is attached to the left end of the drive shaft 39 so that they can be rotated as one body.

A lock nut 49d for positioning of the drive shaft 39 is put into screw engagement with the outer periphery of that part of the drive shaft 39 which protrudes to the right side of the right radial ball bearing 34c and the right hub section 34b. A right collar 49c is clamped between the lock nut 49d and an inner race of the right radial ball bearing 34c at the left side thereof. In this condition, the lock nut 49d in screw engagement with the drive shaft 39 is tightened, whereby the inner race of the right radial ball bearing 34c and the right collar 49c are fastened and fixed between the lock nut 49d and a stepped surface rising from the left end of the right journal 39c to the outer periphery side.

An outer race of the right radial ball bearing 34c is supported by a fixing plate 34d so as not to be movable in the left-right direction relative to the right case cover 34a (right hub section 34b), whereby positioning of the drive shaft 39 relative to the motor case 38 in the left-right direction is accomplished through the right radial ball bearing 34c.

A cup-shaped sensor stay 76 surrounding the periphery of the lock nut 49d is attached to the right side of the right hub section 34b, and a Hall IC (magnetic sensor) 76a is attached to the right end of the sensor stay 76. On the other hand, a right end bolt 78 is put into screw engagement with a right end screw hole in the drive shaft 39, and a sensor collar 77 holding a magnet 77a on the outer periphery thereof is held between a head portion of the right end bolt 78 and the right end of the drive shaft 39 so that they can be rotated as one body. The magnet 77a and the Hall IC 76a constitute a first rotation sensor 79 for detecting the rotational angle of the drive shaft 39.

In addition, to the right side of the left case cover 33a (to the inside of the motor case 38), a resolver stator 81 is attached through a stay 81a. A resolver rotor 82 corresponding to the resolver stator 81 is attached to the outer periphery of the inner flange section 63b of the first rotor. The resolver stator 81 and the resolver rotor 82 constitute a second rotation sensor 83 for detecting the rotational angle of the drive shaft 39, similarly.

It suffices to use either of the rotation sensors 79, 83. When the first rotation sensor 79 (Hall IC) is used, its non-contact detection system promises high durability, its magnetic detection ensures high durability to contaminants such as dirt, dust or oil, and its digital output system promises easy signal processing on the latter stage and permits a reduction in size. On the other hand, when the second rotation sensor 83 (resolver) is used, its structure in which a sensor part is a coil ensures high resolving power, high resistance to heat and the like, and enhanced environmental durability. Further, both the rotation sensors 79, 83 may be used together for fail-safe purpose.

As has been described above, the sports type, saddle type electric vehicle 1 according to the above embodiment has:
the electric drive motor 3 as a drive source for traveling,
wherein the drive motor 3 includes a plurality of motor bodies 3a, 3b arranged coaxially with and adjacently to each other in the vehicle width direction to permit integral driving thereof, and is disposed forwardly of the pivot 14a for the swing arm 15 supporting the rear wheel 4;
one end in the vehicle width direction of the drive shaft 39 of the drive motor 3 is an output end for output to the rear wheel 4, and the drive sprocket 58a for power transmission to the rear wheel 4 is provided at the output end; and
the center (center line MCL) of the drive motor 3 in the vehicle width direction is disposed with an offset to the side opposite to the side of the drive sprocket 58a with reference to the vehicle body center (center line CL).

According to this configuration, the drive motor 3 is formed by arranging the plurality of motor bodies 3a, 3b adjacently to each other in the vehicle width direction at a position near the vehicle body center on the front side of the pivot 14a, whereby a desired motor output can be obtained through appropriate selection of a general-purpose motor or a motor for four-wheel vehicles or the like. Consequently, it is possible to provide a drive motor 3 which is inexpensive, high in general-purpose properties and, particularly, having a high output suitable for a sports type motorcycle.

In addition, the vehicle-width-directional center (the mating surface between the motor bodies 3a, 3b) MCL of the drive motor 3 is disposed with an offset from the vehicle-width-directional center line CL of the vehicle body, whereby the drive sprocket 58a provided on the drive shaft 39 of the drive motor 3 can easily be disposed at a predetermined position in the vehicle width direction. Consequently, the chain line can be adjusted easily even where existing motors are made use of, so that a simple wheel drive system from the drive sprocket 58a can be adopted.

In addition, in the saddle type electric vehicle 1 as above, the electric and electronic parts (PDUs 43, 47; contactors 41, 45; and MCUs 44, 48) are disposed forwardly of the drive motor 3. This ensures the thermal influence of the drive motor 3 on the electric and electronic parts is suppressed, and the airflow is permitted to easily impinge on the electric and electronic parts, whereby cooling performance can be enhanced. In this case, the cooling fins on the heat sink 53 face toward the vehicle forward side, and the airflow is guided along the vertically extending cooling fins, whereby cooling performance for the PDUs 43, 47 can be more enhanced.

In addition, in the saddle type electric vehicle 1 as above, the PDUs 43, 47, the contactors 41, 45 and the MCUs 44, 48 as the electric and electronic parts are arranged in this order from the lower side, whereby the parts on which the airflow is desired to easily impinge can be disposed on the lower side in the vehicle, and the parts on which influences of disturbances are desired to be reduced can be disposed on the upper side in the vehicle. More specifically, the contactors 41, 45 are disposed over the PDUs 43, 47, whereby influences of disturbances can be suppressed while securing cooling performance; in addition, the MCUs 44, 48 are disposed on the further upper side, whereby influences of disturbances can be more suppressed.

In addition, in the saddle type electric vehicle 1 as above, the main battery 2 for supplying electric power to the drive motor 3 has a plurality of battery modules 2a, 2b which have combinations of a plurality of battery cells 17a to 17j and which correspond to the motor bodies 3a, 3b, respectively. Electric power is individually supplied from the battery modules 2a, 2b to the motor bodies 3a, 3b, respectively. This ensures that electric power can be supplied from the battery modules 2a, 2b to the motor bodies 3a, 3b, respectively, without mutual influences.

Further, in the saddle type electric vehicle 1 as above, the main battery 2 is disposed on the upper side of the drive motor 3, whereby the main battery 2 with a heavy weight can be disposed on the upper side in the vehicle, drivability of the motorcycle can be enhanced, and a contribution to mass concentration can be attained.

In addition, the saddle type electric vehicle 1 as above includes a driving force that is transmitted from the drive shaft 39 to the rear wheel 4 through only the chain type transmission mechanism 58 including the drive sprocket 58a.

Since the rear wheel 4 is driven by the drive shaft 39 in a direct manner through only the chain type transmission mechanism 58, power transmission to the rear wheel 4 can be achieved without intermediation by a plurality of transmission mechanisms, so that loss in the drive system can be minimized. Consequently, an increase in mileage of the electric vehicle can be promised, and reductions in size and weight of the drive parts can be ensured.

In the saddle type electric vehicle 1 as above, the rotation sensor 79 for detecting the rotational speed of the drive shaft 39 is provided at the vehicle-width-directionally other end of the drive shaft 39. In addition, at the vehicle-width-directionally one end side of the drive shaft 39, the rotation sensor 83 for detecting the rotational speed of the drive shaft 39 is provided inside the motor case 38 and between a side wall of the motor case 38 and the motor body 3a adjacent thereto. This enables drive control to be applied to each of the motor bodies 3a, 3b according to the rotational speed of the drive shaft 39. In addition, with the rotation sensor 83 housed in the motor case 38, influences of disturbances can be suppressed.

In addition, in the saddle type electric vehicle 1 as above, the sub-battery 51 for accessories is disposed under the motor case 38, and the sub-battery 51 is supported by the motor case 38. This permits the sub-battery 51 to be mounted without needing any exclusive holding part or space.

In the saddle type electric vehicle 1, the main frames 13 extends to the rear from the head pipe 12 and the pivot frames 14 extending downward from the rear ends of the main frames 13. In addition, in vehicle side view, the drive motor 3 is disposed in the area surrounded by the main frames 13 and the pivot frames 14, and the drive shaft 39 is disposed above the pivot 14a. This ensures that the drive shaft 39 (center-of-gravity position) of the drive motor 3 can be disposed at a position as upper as possible in the vehicle, and drivability (turning performance) of the motorcycle can be enhanced. Further, since the main battery 2 is disposed on the upper side of the drive motor 3 located forwardly of the pivot 14a, the drive motor 3 and the main battery 2 as heavy bodies can be disposed close to the vehicle body center, thereby promising mass concentration.

The present invention is not to be restricted to the above-described embodiment. For instance, the invention may be applied to a sports type, saddle type electric vehicle in which a single main frame and a single pivot frame are adopted, instead of a pair of left and right main frames and a pair of left and right pivot frames. The sports type, saddle type electric vehicle include generally those vehicles in which the driver is seated astride a vehicle body. Thus, the sports type, saddle type electric vehicle includes not only motorcycles (inclusive of motor scooter type vehicles) but also three-wheel vehicles (inclusive of two-front-wheel one-rear-wheel vehicles as well as one-front-wheel two-rear-wheel vehicles) and four-wheel vehicles.

The configuration in the above embodiment is merely an example of the present invention, and, naturally, various modifications are possible within the scope of the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle electric vehicle having an electric drive motor as a drive source, comprising:
    said drive motor including a plurality of unit motors arranged coaxially with and adjacently to each other in a vehicle width direction to permit integral driving thereof;
    said plurality of unit motors being disposed forwardly of a pivot for a swing arm supporting a driving wheel;
    one end in the vehicle width direction of a drive shaft of said drive motor is an output end for output to said rear wheel with a drive sprocket for power transmission to said driving wheel being provided at said output end; and
    a center of said drive motor in the vehicle width direction is disposed with an offset to a side opposite to the side of said drive sprocket with reference to a vehicle body center.

2. The saddle electric vehicle according to claim 1, wherein electric and electronic parts for said drive motor are disposed forwardly of said drive motor.

3. The saddle electric vehicle according to claim 2, wherein said electric and electronic parts include motor drivers, contactors and electronic control devices arranged in this order from a lower side.

4. The saddle electric vehicle according to claim 1, and further including a main battery for supplying electric power to said drive motor; and
    said main battery includes a plurality of battery modules having combinations of a plurality of battery cells corresponding to said plurality of unit motors, respectively, and electric power is individually supplied from said battery modules to said unit motors, respectively.

5. The saddle electric vehicle according to claim 2, and further including a main battery for supplying electric power to said drive motor; and
    said main battery includes a plurality of battery modules having combinations of a plurality of battery cells corresponding to said plurality of unit motors, respectively, and electric power is individually supplied from said battery modules to said unit motors, respectively.

6. The saddle electric vehicle according to claim 3, and further including a main battery for supplying electric power to said drive motor; and
    said main battery includes a plurality of battery modules having combinations of a plurality of battery cells corresponding to said plurality of unit motors, respectively, and electric power is individually supplied from said battery modules to said unit motors, respectively.

7. The saddle electric vehicle according to claim 4, wherein said main battery is disposed on an upper side of said drive motor.

8. The saddle electric vehicle according to claim 1, wherein a driving force is transmitted from said drive shaft to said driving wheel through only a chain type transmission mechanism including said drive sprocket.

9. The saddle electric vehicle according to claim 2, wherein a driving force is transmitted from said drive shaft to said driving wheel through only a chain type transmission mechanism including said drive sprocket.

10. The saddle electric vehicle according to claim 3, wherein a driving force is transmitted from said drive shaft to said driving wheel through only a chain type transmission mechanism including said drive sprocket.

11. The saddle electric vehicle according to claim 1, wherein a rotation sensor for detecting rotational speed of said drive shaft is provided at other end of said drive shaft in the vehicle width direction.

12. The saddle electric vehicle according to claim 2, wherein a rotation sensor for detecting rotational speed of said drive shaft is provided at other end of said drive shaft in the vehicle width direction.

13. The saddle electric vehicle according to claim 1, and further including a motor case in which to house said unit motors; and
    on one end side in the vehicle width direction of said drive shaft, a rotation sensor for detecting rotational speed of said drive shaft is provided inside said motor case and between a side wall of said motor case and said unit motor adjacent to said side wall.

14. The saddle electric vehicle according to claim 2, and further including a motor case in which to house said unit motors; and
    on one end side in the vehicle width direction of said drive shaft, a rotation sensor for detecting rotational speed of said drive shaft is provided inside said motor case and between a side wall of said motor case and said unit motor adjacent to said side wall.

15. The saddle electric vehicle according to claim 1, and further including a motor case in which to house said unit motors; and
    a sub-battery for accessories is disposed under said motor case, with said sub-battery being supported by said motor case.

16. The saddle electric vehicle according to claim 2, and further including a motor case in which to house said unit motors; and
a sub-battery for accessories is disposed under said motor case, with said sub-battery being supported by said motor case.

17. The saddle electric vehicle according to claim 1, wherein a main frame extending to a rear from a head pipe and a pivot frame extending downwardly from a rear end of said main frame are provided, and, in a vehicle side view, said drive motor is disposed in an area surrounded by said main frame and said pivot frame, while said drive shaft is disposed above said pivot.

18. The saddle electric vehicle according to claim 2, wherein a main frame extending to a rear from a head pipe and a pivot frame extending downwardly from a rear end of said main frame are provided, and, in a vehicle side view, said drive motor is disposed in an area surrounded by said main frame and said pivot frame, while said drive shaft is disposed above said pivot.

19. An electric drive motor for use with a saddle electric vehicle, comprising:
a plurality of unit motors arranged coaxially and adjacent relative to each other in a vehicle width direction for enabling an integral driving;
said plurality of unit motors being disposed forwardly of a pivot for a swing arm supporting a driving wheel;
an output end being formed on one end in the vehicle width direction of a drive shaft of said drive motor;
a drive sprocket being mounted on said output end; and
a center of said drive motor in the vehicle width direction being disposed with an offset to a side opposite to a side of a drive sprocket with reference to a vehicle body center.

20. The electric drive motor for use with a saddle electric vehicle according to claim 19, wherein electric and electronic parts for said drive motor are disposed forwardly of said drive motor.

* * * * *